United States Patent
Sayers et al.

(10) Patent No.: US 7,496,103 B1
(45) Date of Patent: Feb. 24, 2009

(54) METHOD AND APPARATUS FOR INTEGRATED WIRELESS COMMUNICATIONS IN PRIVATE AND PUBLIC NETWORK ENVIRONMENTS

(75) Inventors: Ian Leslie Sayers, Redwood City, CA (US); Paul Jan Long, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 983 days.

(21) Appl. No.: 10/752,114

(22) Filed: Jan. 6, 2004

Related U.S. Application Data (63) Continuation of application No. 09/408,967, filed on Sep. 29, 1999, now Pat. No. 6,687,243.

(51) Int. Cl.
*H04L 12/28* (2006.01)

(52) U.S. Cl. .................... 370/401; 370/466

(58) Field of Classification Search ............. 370/401, 370/402, 389, 386, 465, 469, 467, 466, 310.2, 370/328, 338, 349.373, 377, 384, 349, 395.5
See application file for complete search history.

(56) References Cited

U.S. PATENT DOCUMENTS

| | | | |
|---|---|---|---|
| 5,602,843 A | 2/1997 | Gray | |
| 5,771,275 A * | 6/1998 | Brunner et al. | 370/385 |
| 5,796,729 A | 8/1998 | Greaney et al. | |
| 5,818,824 A | 10/1998 | Lu et al. | |
| 5,970,059 A | 10/1999 | Ahopelto et al. | |
| 6,014,377 A | 1/2000 | Gillespie | |
| 6,073,029 A | 6/2000 | Smith et al. | |
| 6,167,040 A | 12/2000 | Haeggstrom | |
| 6,223,055 B1 | 4/2001 | Cyr | |
| 6,243,581 B1 | 6/2001 | Jawanda | |
| 6,314,284 B1 | 11/2001 | Patel et al. | |
| 6,317,609 B1 | 11/2001 | Alperovich et al. | |
| 6,411,632 B2 * | 6/2002 | Lindgren et al. | 370/466 |
| 6,424,638 B1 | 7/2002 | Ray et al. | |
| 6,683,881 B1 * | 1/2004 | Mijares et al. | 370/401 |

FOREIGN PATENT DOCUMENTS

EP          0 766 427 A2     4/1997

* cited by examiner

*Primary Examiner*—Brenda Pham
(74) *Attorney, Agent, or Firm*—Hamilton, Brook, Smith & Reynolds, P.C.

(57) ABSTRACT

A communications system extends over a cellular region formed of a plurality of wireless cells where each cell covers a portion of the cellular region. Each cell has a base station which is responsible for communication with the cellular subscriber. In order to for the call to be properly managed in the public cellular domain, responsibility for call handling and processing must first by managed by the public MSC. Call handling with the public MSC for a private cellular subscriber first requires the exchange of information between the two systems. This is facilitated through the exchange of MAP and A interface signaling between the private and public cellular systems. Since this information on the private network is normally transmitted via IP, this information must be converted to standard SS7 based MAP and A protocol signaling in order for the public MSC to process.

26 Claims, 8 Drawing Sheets

METHOD AND APPARATUS FOR INTEGRATED WIRELESS COMMUNICATIONS IN PRIVATE AND PUBLIC NETWORK ENVIRONMENTS

RELATED APPLICATION(S)

This application is a continuation of U.S. application Ser. No. 09/408,967, filed Sep. 29, 1999 now U.S. Pat. No. 6,687, 243. The entire teachings of the above application are incorporated herein by reference.

BACKGROUND OF THE INVENTION

The present invention is a method and apparatus that provides for interconnection of private and public cellular networks, facilitating the exchange of subscriber profile and network 30 data between systems.

Conventional Cellular Systems

Present day cellular mobile telephone systems provide for a large and increasing demand for mobile services. Cellular systems "reuse" frequency within a group of cells to provide wireless 35 two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Services Switching Center (MSC). In a typical cellular system, one or more MSCs will be used over the covered region. Each MSC can service a number of base stations and associated cells in the cellular system and supports switching operations for routing calls between other systems (such as the PSTN) and the cellular system or for routing calls within the cellular system.

Base stations are typically controlled from the MSC by means of a Base Station Controller (BSC). The BSC assigns RF carriers to support calls, coordinates the handoff of mobile users between base stations, and monitors and reports on the status of base stations. The number of base stations controlled by a single MSC depends upon the traffic at each base station, the cost of interconnection between the MSC and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods. The Global System for Mobile Communications (GSM), PCS1900, IS-136, and PDC standards are examples of TDMA methods in current use.

The present specification uses a GSM system for purposes of explanation but the present invention applies to any wireless system protocol.

GSM Cellular Systems

The GSM system architecture is described, for example, in detail by M. Mouly and M.-B. Pautet, The GSM System for Mobile Communications, 1992 and Mouly and M.-B. Pautet, *GSM Protocol Architecture: Radio Sub-system Signaling*, IEEE 41st Vehicular Technology Conference, 1991. The following sections highlight some unique aspects of GSM systems.

The GSM system provides many advanced services, including: ISDN compatible supplementary services; Global roaming among GSM networks and other network types; advanced packet data services.

GSM System Architecture

There is a very comprehensive set of GSM Specifications which define the three major components of any GSM network, namely, the Mobile Station (MS), Base Station Sub-System (BSS) and the Network Sub-System (NSS).

Base Station Subsystem (BSS)

The Base Station Subsystem (BSS) is subdivided into two main entities, the Base Transceiver Station (BTS) and the Base Station Controller (BSC). The BTS includes the radio transceivers that define the radio cell and supports the radio (Um) interface link to the mobile station. The BTS further supports the defined channel coding, encryption and speech coding functions. The BTS interfaces to the BSC via the Abis-interface.

The Base Station Controller (BSC) manages the radio resources of multiple BTSs. The BSC controls all of the functions related to the radio network, including the allocation and release of radio resources and control of radio interface hand-overs. The BSC interfaces to the MSC via the A-interface.

Network Subsystem

The network subsystem (NSS) comprises four components these are, the Mobile services Switching Center (MSC), Home Location Register (HLR), Visitor Location Register (VLR), AUthentication Centre (AuC) and the Equipment Identity Register (EIR).

The main part of the network subsystem (NSS) is provided by the Mobile services Switching Center (MSC). The MSC provides the ability to track the mobile user, switch calls to/from the user to the PSTN/ISDN/PLMN (public land mobile network) and maintain contact with the mobile user via radio handovers.

The GSM PLMN (GSM public land mobile network) contains two database functions related to the mobility of the user these are the Home Location Register (HLR) and the Visited Location Register (VLR).

The Home Location Register (ULR) is used by the operator to maintain data on all their subscribers. The subscriber data includes both fixed data, such as International Mobile Subscriber Identity (IMSI), subscriber MSISDN number and selected supplementary services, and dynamic data such as whereabouts of the mobile user and current settings for any supplementary services. Whenever a mobile users roams into a new Visitor Location Register (VLR) area the HLR downloads the subscriber data to the VLR. The HLR is also required to deal with mobile terminating calls by routing the call to the correct VLR for further processing.

The Visitor Location Register (VLR) is used as a local cache to store the subscriber data near the current location of the mobile user. Once the VLR has downloaded the subscriber data the mobile user can begin to use the services provided by the network. The process of downloading the user data and establishing a presence in a particular location is called roaming.

In order to prevent fraudulent use of the network the GSM PLMN also contains two further databases the Authentication Centre (AUC) and the Equipment Identity Register (EIR).

The Authentication Center (AUC) is a maintained in a secure environment since it contains the network authentication algorithms. The network uses this database to obtain data that is used to "challenge" the mobile user when they make an access to the network. The AUC uses two algorithms known as A3 and A8, which are also stpred in the Subscriber Identity Module (SIM) of the user. The A3 algorithm is used to authenticate the user by the familiar challenge response mechanism. The A8 algorithm is used to generate the required key for the radio interface encryption algorithm know as A5. Generally the A3 and A8 algorithms are developed by the network operators.

The Equipment Identity Register (ELR) contains a list of all the valid International Mobile Equipment Identity (IMEI) values. Using the unique IMEI value associated with all mobiles it is possible restrict the use of specific mobiles. This database is used to prevent the use of stolen or misbehaving mobile stations.

Operations and Maintenance

Associated with the BSS and NSS equipment are Operations and Maintenance Centers, OMC-R and OMC-S, respectively. The OMC-R and OMC-S provide the following standard operations and maintenance control functions for the GSM BSS and NSS:

Configuration Management
Fault management
Test Management
Performance Management
Security Management
Account Management Other functions may be available depending upon the BSS or NSS manufacturer. In addition the OMC-S may also be required to perform database or user management functions on the HLR and VLR.

Basic Services Provided by GSM

GSM was designed to be a feature rich mobile services with most services based upon ISDN principles. In basic terms the GSM provides a basic set of services which can be enhanced by the use of supplementary services. The Basic Services include:

Speech, the most basic service
Short Message., a two way messaging service
Group 3 FAX, this services allows connection to Group 3 FAX machines
Cell Broadcast, this service allows messages to be broadcast to the mobile stations.

The Bearer Services include:

Asynchronous Data 300-14400 bps, allows access to normal V-Series Modems
Synchronous Data 300-14400 bps, allows access to CSPDNs
General Packet Radio Services 9600-170000 bps, a packet services allowing seamless access to the internet.

The following GSM supplementary services are currently available:

Call Forwarding
Call Barring Services
Call Transfer
Conference Calling
Call Wait and Call Hold
Calling Line Identification
Call Completion to a Busy Subscriber Problems with Private/Public Cellular Networks Communicating MAP Via IP In wireless systems, it is often necessary to exchange MAP information between the private and public cellular networks, In the case of modern voice over LP (VoIP) H.323 and other IP based networks, it is not possible to communicate using the cellular protocols such as Mobile Application Part (MAP) or A-interface protocol via SS7, Conversely, neither is it possible for the public system to communicate using MAP or A-interface protocol with an H.323 or IP based network.

In accordance with the above background, it is the object of the present invention to provide wireless systems having the capability to exchange MAP interface information between IP and SS7 environments and between an IP network using an A-Interface.

SUMMARY OF THE INVENTION

The present invention is a communication system extending over a cellular region and formed of a plurality of wireless cells where each cell covers a portion of the cellular region. The communication system includes first and second wireless networks that use different protocols for communications in connection with mobile stations. The system includes a connection unit for interconnecting the first and second wireless networks and includes an interworking unit for protocol conversion between the different protocols.

The first wireless network, such as a public wireless network (PLMN), communicates with a first protocol, such as Signaling System #7 (SS7), for one or more first cells in the first wireless network. Each of the first cells includes a first base station for communicating with mobile stations in a first cell and a first control means using the first protocol for communications associated with the first base station. The second wireless network, such as a private wireless network, communicates with a second protocol, such as IP, for one or more second cells in the second wireless network. Each of the second cells includes a second base station for communicating with mobile stations in a second cell and a second control means using the second protocol for communications associated with the second base station.

The first and second wireless networks are connected through the connection unit that includes a gateway, such as a H.323 gateway, for coordinating communications between the different protocols used in the first and second wireless networks. The gateway or other parts of the connection unit may reside anywhere in the communication system such as on the premises of the private wireless network or on the premises of the PLMN cellular operator's site. The connection unit includes a cell router for routing calls among the base stations. The cell router is implemented in various embodiments using IP routers, Frame Relay and ATM switches.

The first and second wireless networks are coordinated by the interworking unit that translates commands in one protocol to those in another. Where the first and second wireless networks are PLMN and IP networks, the interworking unit includes, for example, an SS7 stack, an IP stack and a protocol converter for converting messages between IP messages and MAP messages, A-Interface messages or messages of other protocols.

The interworking unit may reside anywhere in the communication system such as on the premises of the private wireless network or on the premises of the PLMN cellular operator's site. The interworking unit is typically software executing on an suitable computing platform. The platform can use, for example, a Windows NT, a Unix or other operating system. In a typical configuration, communications internal to the private wireless network are via H.323 and communications with a public wireless network (PLMN) to an MSC and/or HLR are via a SS7 based link.

The present invention is useful in a communication system formed by a private network that includes a private wireless network based on IP. The communication system is also useful in public wireless networks using public wireless protocols, such as GSM, TDMA, or CDMA. These public systems typically connect to other public networks, such as PSTN, ISDN and the Internet using a wired protocol, such as IP, ATM or Frame Relay. The private network also typically includes a local area network (LAN) and the private network typically connects to the public networks using a wired packet protocol, such as IP.

In connection with some embodiments, the public and private wireless networks operate with the same public wireless protocol, such as GSM, TDMA or CDMA, and the private wireless network additionally operates with a wired packet protocol, such as IP.

The private wireless network uses private base stations (P-BTS) which include software for a wireless protocol, such as GSM, TDMA or CDMA, including software for private network operation with a wired protocol, such as IP.

The communication system permits users to operate freely in both public and private wireless networks using standard mobile stations while achieving high private network data rates. The communication system typically uses normal wireless handsets or other mobile or fixed stations without need for any modifications.

The private base stations (P-BTS) in one embodiment are directly connected to a private LAN and thereby enable standard wireless stations to make and receive calls over the LAN. Also, the range of calls, using standard Internet protocols, extends between LANs and between different corporations over the Internet without requiring the support of a public switch (e.g. MS C). The wireless stations can freely roam between the public wireless network and the private wireless network and a single telephone number can be assigned to a mobile station for use in both the public and the private wireless networks.

The foregoing and other objects, features and advantages of the invention will be apparent from the following detailed description in conjunction with the drawings.

BRIEF DESCRIPTION OF THE DRAWINGS

FIG. 2.

DETAILED DESCRIPTION OF THE INVENTION

Figure 1:
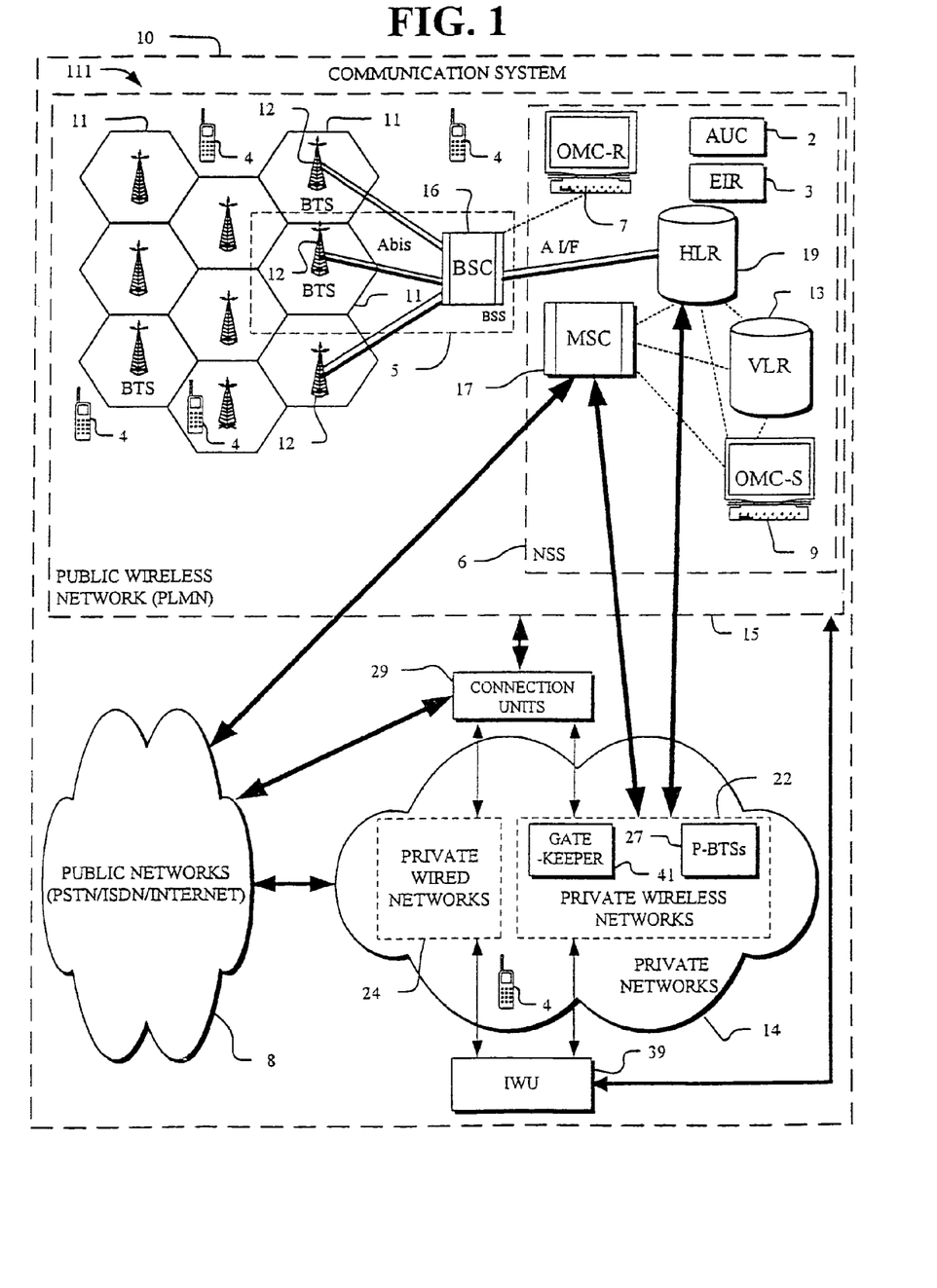
FIG. 1 is a block diagram representation of a communication system including a public wireless network, other public networks such as PSTN, ISDN and the Internet and including private networks.
Figure 2:
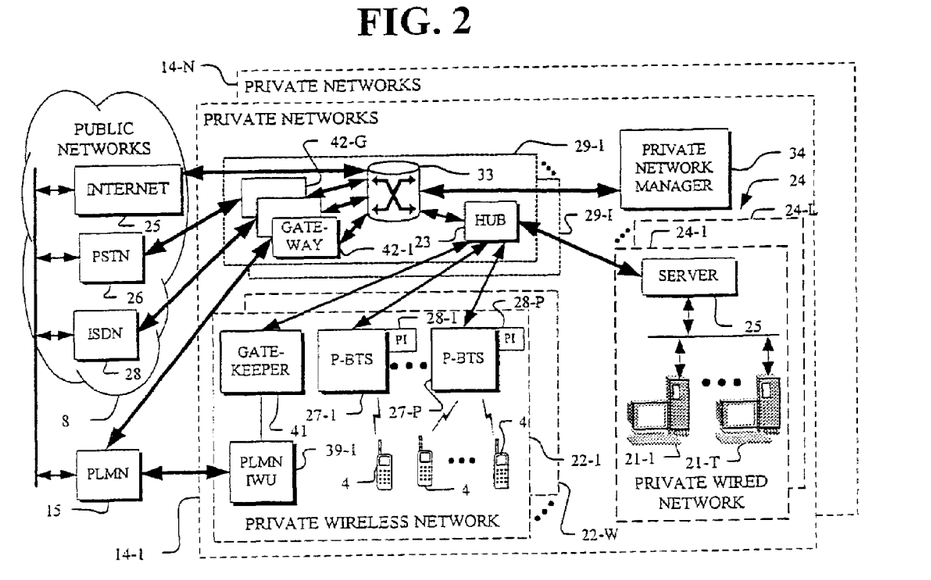
FIG. 2 depicts private networks and public networks including a public wireless network connected to a private wireless network.

Communication System—FIG. 1 and FIG. 2.

In FIG. 1, the communication system 10 includes a public wireless network 15, public networks 8 (such as PSTN, ISDN and the Internet) and private networks 14, The public wireless network 15 includes the ability to communicate, in a conventional manner, with conventional wireless mobile stations 4. The private networks 14 function to communicate with the conventional mobile stations 4 and provide additional private network capabilities not provided by the public wireless network 1.5.

The public wireless network 15 of FIG. 1, sometimes called the public land mobile network (PLMN), includes the mobile stations (MS) 4, Base Station Sub-System (BSS) 5 and the Network Sub-System (NSS) 6. The Base Station Subsystem (BSS) 5 is composed of the Base Transceiver Stations (BTSs) 12 and the Base Station Controller (BSC) 16. Each of the BTSs 12 includes a radio transceiver that defines the radio boundary of a cell 11 and handles the radio (Um) interface protocols with the mobile stations 4.

The cells 11 in the wireless public network 15 of FIG. 1 each exist over a different area and together the cells 11 collectively exist over a larger area designated as a region 111. Each cell I 1 in the region I 1 I uses frequencies or other properties that are isolated from the frequencies or other properties of other cells in the region. When mobile stations 4 travel from one of the cells I 1 to another one of the cells 11, a hand-over occurs.

The private networks 14 of FIG. I include private base stations (P-BTSs) 27 within the private wireless networks 22 for communications with mobile stations 4 located within the domain of the private networks 14. The private base stations (P-BTSs) 27 function in private regions formed of private cells (see private cells 411 of FIG. 4) within the domain of the private networks 14 of FIG. 1. The private cells 411 typically cover a portion of the area covered by one or more of the cells I 1 of the public wireless network 15 of FIG. 1. Typically, the allocation of frequency spectrum in different public and private regions is under governmental control and frequency spectrum is allocated to different entities in different regions and different countries. The owner of the rights to particular frequencies in a region, including regions for public wireless network 15 and private wireless networks 22, controls the allocation of frequencies among public cells 11 of FIG. I and the private cells 411 (see FIG. 4).

The Base Station Controller (BSC) 16 manages the radio resources of one or more BTSs 12 across an Abis interface. The BSC 16 controls the radio network, including allocation of radio time slots and frequencies to mobile stations 4, release of resources, interpretation of measurement results and control of radio interface hand-overs. The BSC 16 interfaces to the NSS 6 via an A-interface to MSC 17. The Network Subsystem (NSS) 6 includes the Mobile services Switching Center (MSC) 17 that provides, in a conventional system, the functions required to switch calls to/from the mobile stations 4 and the fixed public networks 8 (including PSTN and ISDN). In addition, the MSC 17 also provides the functions needed to track and maintain communication with mobile stations 4 and these functions include registration, authentication, location updating, MSC hand-overs, and call routing to roaming mobile stations 4. The GSM/TDMA/CDMA cellular system employs a Home Location Register (BLR) 19 and a Visitor Location Register (VLR) 13, an Authentication Center (AUC) secure database 2 and an Equipment Identity Register (EIR) 3. The Operations and Maintenance Center includes the OMC-R 7 and the OMC-S 9.

In FIG. 1, private networks 14 include the private wireless networks 22 (including private wireless networks 22-1, . . . , 22-W as shown in FIG. 2), private wired networks 24, including local area networks (LANs, 24-1, . . . , 24-L, as shown in FIG. 2), and connection units 29 (including connection units 29-1, . . . , 29-I as shown in FIG. 2). The private networks 1.4 can include wide area networks (WAN) and any other type of network presently or hereafter available. As shown in FIG. 2, the connection units 29 of FIG. 1 include, in one embodiment, hubs 23 for interconnecting the private wireless networks 22 and the LANs 24 and for connecting the private networks 14 to the public networks 8. As shown in FIG. 2, a typical hub 23 connects to a router 33 that directs calls among the public network facilities including the ISDN 28, the PSTN 26, the Internet 25 and the private networks 14. The private networks 14 use the same protocol as the Internet 25 and connects directly without need for a separate gateway. The connection units 29 include, as shown in FIG. 2, gateways 42-1, 42-2, . . . , 42-G for connecting the ISDN 28 and the PSTN 26 which use different protocols than the private networks 14.

In FIG. 1, the private wireless networks 22 include the wireless capabilities of the public wireless network 15 of FIG. 1. In addition, the private wireless networks 14 are suitable for operating with advanced technologies that are not generally available publicly. Current advanced technologies operate with rates of 384 kb/s and are approaching rates of 2 Mb/s for W-CDMA. In FIG. 1, wireless communications between the public BTSs 12 and mobile stations 4 operate with a wireless protocol such as GSM/TDMA/CDMA. In FIG. 1, wireless communications between the private P-BTSs 27 and mobile stations 4 for convenience and compatibility operate with the same wireless protocol (such as GSM/TDMA/CDMA) as used, by the public BTSs 12 in the public wireless network 15.

In FIG. 1, the private wired networks 24 are typically local area networks (LANs) operating with a wired packet protocol such as IP.

The private wireless networks 22 in FIG. 1 do not require the internal support of circuit switch from the public networks and therefore, the private networks 14 in the FIG. 1 system can easily expand to accommodate new user requirements under control of the owners of the private networks 14.

In the private networks 14 of FIG. 1, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 1 without restriction. Because of this free movement capability, only a. single number is required for each mobile station 4 for both private wireless network communications and for public wireless network communications.

The private wireless networks 22 of FIG. 1 have P-BTSs 27 with corresponding private cells (P cells) 411 (see FIG. 4) in the private wireless domain. The public wireless network 15 of FIG. 1 has BTSs 12 with corresponding public cells 11 in the public wireless domain. The allocation of frequencies among the public wireless network cells and the private network cells is determined by agreement of the owners of the public wireless network 15 and the private networks 14.

The private wireless networks 22 of FIG. 1 each have an interworking unit (IWU) 39 that facilitates the inter-working of different protocols that coact in processing calls from one wireless network to another. The private wireless networks 22 of FIG. 1 have gatekeepers 41 that function to correlate addresses that are for the same mobile stations but which are presented in different protocols.

Interconnected Public Wireless Network and Private Wireless Network—FIG. 2

In FIG. 2, private networks 14 include private networks 14-1, . . . , 14-N. Private network 14-1 is typical and includes the private wireless networks 22 (including LANs 24-1, . . . , 24-L), and connection units 29 (including connection units 29-1, . . . , 29-I). The private networks 14 can include wide area networks (WAN) and any other type of network presently or hereafter available. The connection unit 29 includes a hub 23 for interconnecting the private wireless networks 22 and the LANs 24 and for connecting the private network 14-1 to the public networks 8. The hub 23 connects to the router 33 that directs calls among the public network facilities including the ISDN 28, . . . , PSTN 26 and the Internet 24 and the private networks 14. The private networks 14 use the same protocol as the Internet 25 and connect directly-without need for a separate gateway. The connection unit 29 includes gateways 42-1, . . . , 42-G for connecting the ISDN 28, . . . , PSTN 26 which use different protocols thatn the private networks 14.

In FIG. 2 the private wireless networks 22 include the wireless capabilities of the public wireless network 15 of FIG. 1. In FIG. 2, wireless communications between the private P-BTSs 27 and mobile station 4 for convenience and comparability operate with the same wireless protocol (such as GSM) as used by the public BTSs 12 in the public wireless network 15.

In FIG. 2, the local area networks (LANs) 24 are private wired networks operating with a wired packet protocol such as IP. LAN 24-1 is typical and includes, for example, a server 25 and LAN terminals 21 (including terminals 21-1, . . . , 21-T). Terminals 21-1, . . . , 21-T communicate with each other and with the public networks 8 through connection unit 29 using the wired packet protocol.

In FIG. 2, the P=BTSs 27-1, . . . , 27-P are associated with protocol converters 28-1, . . . , 28-P, respectively, that connect P-BTSs 27-1, . . . , 27-P to connection unit 23 using the private network protocol used by the LANs 24 and the router 23.

Therefore, the mobile stations 4 communicating through the P-BTSs 27 in the private networks 14 have access to the terminals 21 in LANs 24 and have access to the public networks 8.

In FIG. 2, the wireless P-BTS 27 directly connect the mobile stations 4 through router 33 to other facilities in private networks 14 and thereby permit, for example, the mobile stations 4 to send and receive calls to and from the terminals 21 in the LAN networks 24. Furthermore, the range of calls from and to mobile stations 4 in the private wireless network 22, using standard Internet protocols (IP), extends over the Internet in public networks 8 to any Internet facility such as different LANs and different corporations in different regions or countries.

The private wireless networks 22 in FIG. 2 do not require the internal support of a circuit switch (for example, an MSC) from the public networks and therefore, the private networks 14 in the FIG. 2 system can easily grow to accommodate new user requirements under control of the owners of the private networks 14.

In the private networks 14 of FIG. 2, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 2 without restriction. Because of this free movement capability, only a single number is required for each mobile station 4 for both private wireless network communications and for public wireless network communications.

Figure 4:
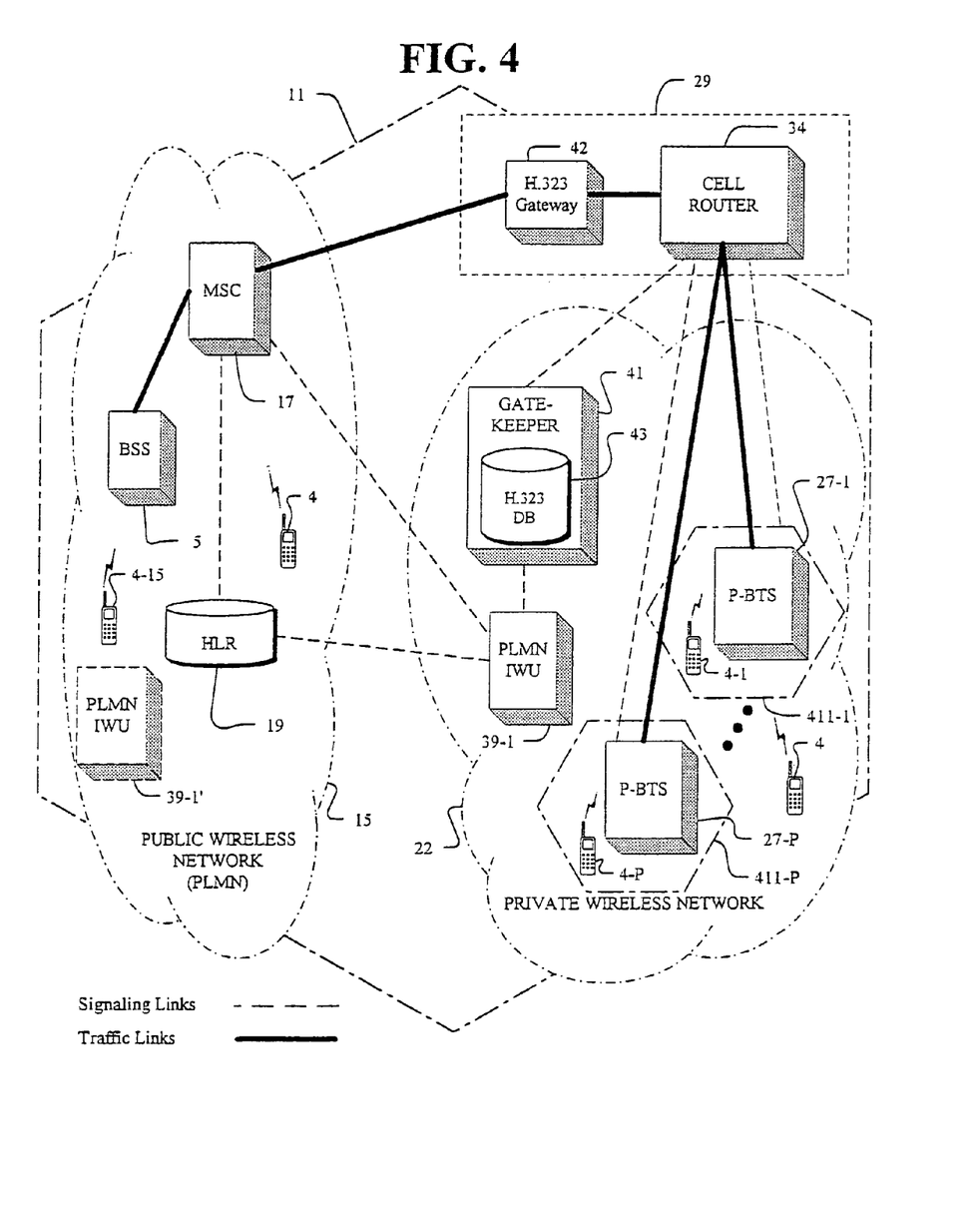
FIG. 4 depicts a representation of the signaling links and the traffic links between the private wireless network and the public wireless network in FIG. 1.

The private wireless networks 22 of FIG. 2 have P-BTSs 27-1, . . . , 27-P which operate in the private cells 411 (See FIG. 4). The allocation of frequencies among the public wireless network cells 11 and the private network cells 411 is determined by agreement of the owners of the public wireless network 15 and the private networks 14.

In order to allow users to roam freely between the public wireless network 15 and private wireless networks 22, a PLMN interworking unit (PLMN IWU) 39-1 is provided. The PLMN IWU 39-1 connects to the Private Wireless Networks, Gatekeeper 41 and the PLMN 15. The PLMN IWU 39-1 can be connected to the H.323 Gatekeeper database 43 by a number of means, however in this example, the IWU is connected via an IP link. The PLMN IWU 39-1 is connected to the PLMN via a Signaling System 7 (SS7) link that is running Message Transfer Part (MTP), Signaling Connection Control Part (SCCP), Transactions Control Application Part (TCAP) and the Mobile Application Part (MAP). The PLMN IWU 39-1 converts between the signaling protocols found in the Private Network 22-1 which are based upon IP and the PLMN which is based on SS7.

In FIG. 2, the gatekeeper 41 includes a local database (see data base 43 in FIG. 4) which communicates via IP providing local user authentication, a local client for communicating with a remote protocol gateway (gateway 42 provides remote IP-to-SS7 conversion) through cell router 34, and a local interface module which communicates over IP to the PLMN IWU 39-1.

Figure 3:
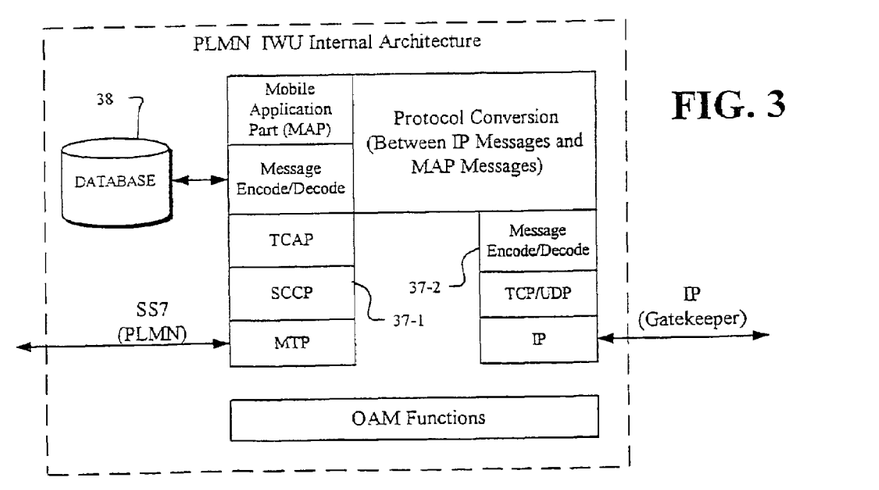
FIG. 3 depicts the architecture of a public land mobile network interworking unit (PLMN IWU) used in the private wireless network of FIG. 2 to communicate with the public land mobile network (PLMN).

Public Land Mobile Network Interworking Unit—FIG. 3

FIG. 3 shows the internal architecture of the interworking unit (IWU) 39 when the IWU is a Public Land Mobile Network Interworking Unit (PLMN IWU) which provides a link between the domain of the private wireless network 22 and the domain of the public wireless network (PLMN) 15. In a preferred embodiment, the signaling for the private wireless network 22 operates in the IP domain and signaling to the public wireless network 15 operates in the SS7 domain. In such an embodiment, the PLMN IWU 39-1 contains two independent software stacks 37-1 and 37-2, one for the private IP domain and one for the public SS7 domain.

The first stack 37-1 is used to interface with the SS7 network and includes standard MTP, SCCP and TCAP layers. On top of these layers is a Message Encoder/Decoder layer which is responsible for receiving and dispatching of messages from/to the SS7 network. This layer functions to take the messages generated by the Mobile Application Part and correctly format them for use by the lower layers of the first stack 37-1. The Mobile Application Part is a standard stack layer as defined for GSM, TDMA and CDMA cellular systems.

The second stack 37-2 is used to interface with the IP network and includes standard IP and TCP/UDP layers. On top of these layers is a Message Encoder/Decoder layer which is responsible for the receiving and dispatching of messages from/to the IP network. This layer functions to take the messages generated by the Protocol Conversion layer and correctly format them for use by the lower layers of the second stack.

The main functionality of the PLMN IWU 39-1 is contained in the Protocol Conversion layer. The Protocol Conversion layer functions within the PLMN IWU 39-1 to process commands (called pseudo-MAP messages in the description below) sent by the IP network (originating from the H.323 database 43) and converting them to MAP messages that can be recognized by the public wireless network 15. In the embodiment described, the particular messages are based upon the H.323 suite of protocols, however other VoIP protocols, such as SIP, can be similarly implemented in the IP-MAP Protocol Conversion layer. The operation of the Protocol Conversion layer is algorithmically predetermined with a mapping between all the H.323 messages and their MAP counterparts. When a pseudo-MAP message of, for example, type A arrives from the H.323 IP side of the unit it is converted into a MAP message type B for sending out on the public wireless network 15 SS7 side, Similarly if a message of type B arrives on the public wireless network 15 SS7 side it will be converted to type A on the H.323 IP side of the unit.

In order to correctly address the messages between the SS7 entities and IP entities, a database 38 is provided that maps SS7 point codes or E.164 numbers to their corresponding IP addresses. Using this scheme, all messages reach their correct recipients. The database 38 in one embodiment is statically set via the operations and maintenance interface and in another embodiment is dynamically built as new addresses are received.

The OAM Functions maintain the operation of the PLMN IWU 39-1. The OAM Functions are responsible for administering the database 38 and all the addresses that are needed in the communication system. The OAM Functions are also responsible for correctly assigning SS7 and $11^{11}$ address to the PLMN IWU 39-1 itself so that it may appear in both the IP and SS7 domains.

In the embodiment described, the PLMN IWU 39-1 software functions are located in one common entity. However, in other embodiments, the PLMN TWU 39-1 software functions are split into two or more separate entities that are in the same or in different locations in the communication system. For example, the Protocol Conversion function for converting between IP and MAP messages can be performed in one entity, such as the H.323 database 43, and the sending of MAP messages on the SS7 network can be performed in another entity.

Signaling Links and Traffic Links Between Private and Public Wireless Networks—FIG. 4

FIG. 4 provides a detailed view of a private wireless network 22, having a PLMN IWU 39, interconnected between the public wireless network (PLMN) 15 and private wireless network 22. The private wireless network 22 includes a plurality of P-BTS 27, including P-BTS 27-1, . . . , 27-P, each associated with a corresponding private cell 411, including the private cells 411-1, . . . , 411-P, respectively. The public wireless network 15 includes an MSC 17 and a BSS 5 associated with the public cell 11. The public cell 11 typically covers a larger area than the private cells 411 and typically the private cells 411 are within the operating region of the public cell 11. Each of the public and private cells include mobile stations 4, for example, mobile station 4-1 is typical of the mobile stations serviced by P-BTS 27-1 in the private wireless network 22 and mobile station 4-P is typical of the mobile stations serviced by P-BTS 27-P in the private wireless network 22. The mobile station 4-15 is typical of the mobile stations serviced by BSS 5 in the public wireless network 15.

In FIG. 4, the PLMN IWU 39-1 is interconnected to the public HLR 19 and MSC 17 of the public wireless network (PLMN) 15 via signaling links (shown as broken lines in FIG. 4). In the embodiment described, these signaling links use the SS7 protocol. The PLMN IWU 39-1 also connects to the gatekeeper 41 that includes the H.323 database 43 via a signaling link that uses the IP protocol. In the embodiment described, the PLMN IWU 39-1 connection to the gatekeeper 41 only carries signaling information, however, in other embodiments, it may carry voice or other related signaling traffic.

While the PLMN IWU 39-1 has been shown as a single entity located in the private wireless network 22, the PLMN IWU 39-1 can also be located in the public wireless network 15 (shown with broken lines as 39-I') as a single entity or can be distributed in parts at various different locations. The links between the PLMN IWU 39-1 and other components are implemented as a function of where the PLMN IWU 39-1 or its parts are located. In FIG. 4, the PLMN IWU 39-1 is located as a single entity in the private wireless network 22 and the links from the PLMN IWU 39-1 with the MSC 17 and HLR 19 exist in different forms. In one form, the links are leased lines or other direct connections. In another embodiment, the connections between the PLMN IWU 39-1 and the PLMN 15 are indirect through, for example, the cell router 34.

In FIG. 4, the public wireless network (PLMN) 15 includes the gatekeeper 41 that connects to a connection unit 29. The connection unit 29 includes means for interconnecting a mobile station 4, for example, mobile station 4-1 serviced by P-BTS 27-1 in the private wireless networks 22 to another mobile station 4, for example, mobile station 4-P serviced by P-BTS 27-P in the private wireless network 22. Also, the connection unit 29 includes means for interconnecting a mobile station 4, for example, mobile station 4-1 serviced by P-BTS 27-1 in the private wireless networks 22 to another mobile station 4, for example, mobile station 41-15 serviced by the BSS 5 in the public wireless network 15. When such connections involve different signaling protocols, each of the protocols are abstracted to the protocol (for example, H.323) database 43.

The connection unit 29 can use any convenient switching or routing apparatus for directing calls from one mobile station to another. For example, in one embodiment described, the cell router 34 in connection unit 29 is an IP router that uses IP addresses for routing calls among the P_BTSs 27 or for routing calls through H.323 gateway 42 to the public wireless network 15. In another example, the cell router 34 includes an ATM or other switch that switches calls among mobile stations 4 located in any of the cells including public cell 11 and private cells 411-1, . . . , 411-P.

The gatekeeper 41 enables protocol independent cell routing using cell router 34 with information from address correlation database 43. Gatekeeper 41 includes a lookup table which correlates identifiers in different protocols. The different protocols include, for example, IP addresses, MSRN numbers, and virtual circuit identifiers (VCI). The correlation performed in gatekeeper 41 using database 43 enables any embodiment of cell router 34 to correlate identifiers from different protocols. By way of example, the router 34 in different embodiments is implemented as an IP router, a frame relay switch, or an ATM switch. In each of these embodiments, cell router 34 functions to switch and/or route mobile traffic to and from mobile stations 4.

The switching role of a conventional MSC 17, such as shown in FIG. 1, is fulfilled by packet or cell routing hardware included within cell router 34. In operation, for example, when a mobile station 4 in FIG. 4 requests a path through the network, the gatekeeper 41 maps an MSRN number to an appropriate IP address in the case of an IP router. In operation, for another example, when a mobile station 4 in FIG. 4 requests a path through the network, the gatekeeper 41 maps a VCI address to an appropriate IP address in the case of an ATM switch and further the gatekeeper 41 maps an MSRN number to the appropriate IP address. Similar mappings are effected for any IP, frame, ATM switch or other routing or switching mechanism. The IP, MSRN, VC1 or other identifier mapping occurs in the gatekeeper 41 and hence operation is independent of any particular embodiment of router 34, Also, the particular routing mechanism employed for switching calls among cells is external to the private wireless network 22. The private wireless network 22 is able to operate with any protocol that may exist or may be defined.

Operation

The operation of the PLMN IWU 39-1 and the communication system 10 of FIG. 1 are described in connection with four call flows presented in FIG. 5, FIG. 6, FIG. 7 and FIG. 8 for a system in which the public wireless network 15 operates in the SS7 domain and the private wireless network 22 operates in the IP domain. In each of those figures, the operation inside the double-boarded box represents the functionality of the IP/SS7 Protocol Conversions for signaling.

Figure 5:
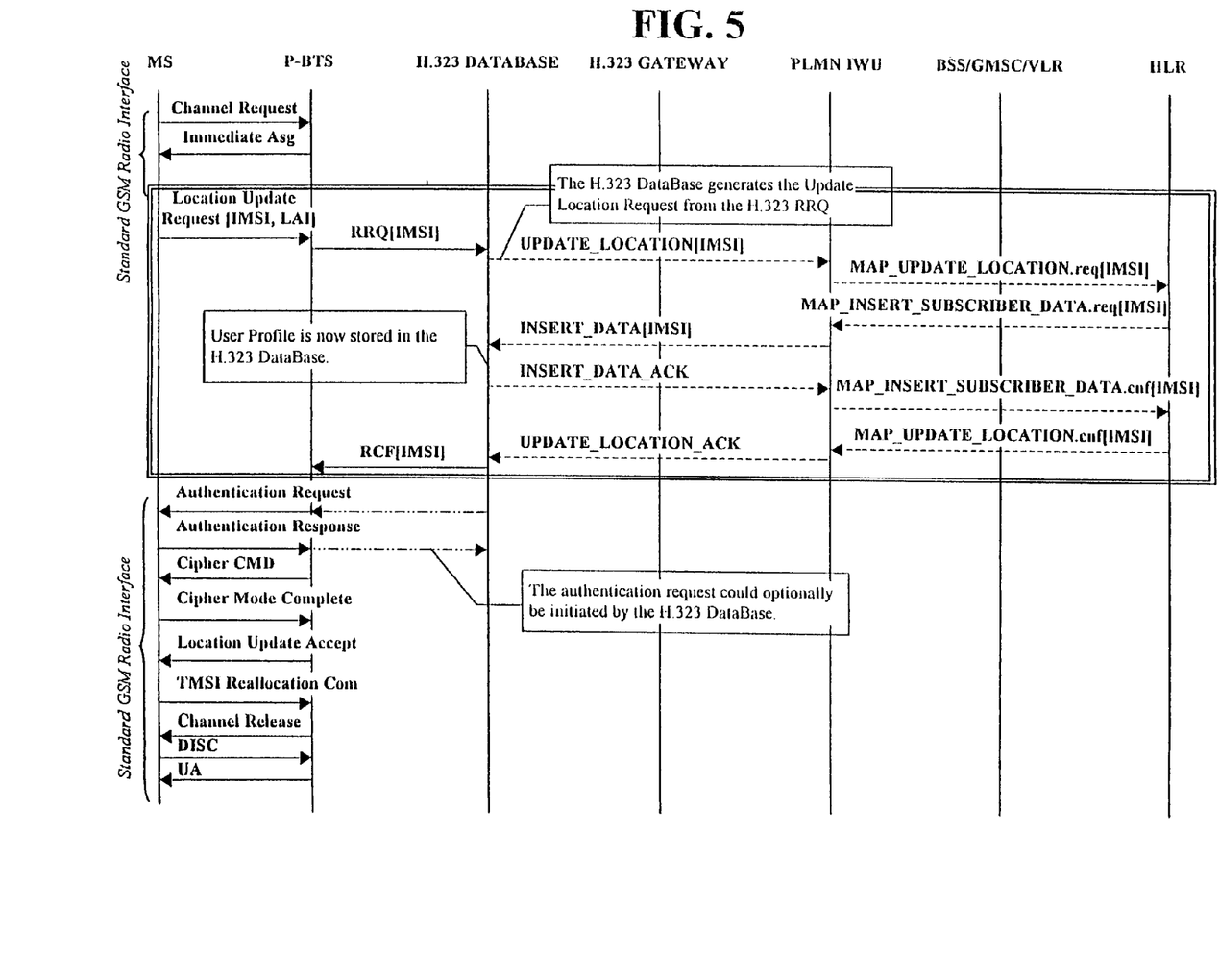
FIG. 5 depicts the location update procedures for a public user in the private network using the PLMN IWU.

Location Update Procedures for a Public User on the Private Network—FIG. 5

In FIG. 5, the signaling flows that are used to register the Public User on the Private Network are presented.

In the first part of the call flow, the Public Users Mobile Station (MS) accesses the P-BTS using the standard Channel Request/Immediate Assignment signaling messages. This is followed by the Location Update Request message containing the IMSI and LAI from the Mobile Station. Upon receiving this message, the P-BTS then sends an H.323 Registration Request (RRQ) to the H.323 database 43. The RRQ contains the IMSI information for the Mobile Station. The H.323 database 43 then translates this information into the correct psuedo-MAP message, in this case an UPDATE_LOCATION which contains the IMSI of the Mobile Station and the originating IP address of the H.323 database 43. When the message arrives at the PLMN IWU 39-1, using IP, it is translated further into a complete MAP message, in this case MAP_UPDATE_LOCATION, and the SS7 point code or E.164 number of the Public Users HLR 19 is derived from the IMSI and appended to the message. The complete message can now be passed to the SS7 network and sent to the Public Users HLR 19. At the same time a new TCAP transaction is opened and associated with the IP address and transaction identity of the H.323 database 43, as well as the SS7 address of the HLR 19. Upon receipt of this message, the HLR 19 will perform the standard operations to verify the users identity. If successful, the HLR 19 will then return the MAP_INSERT_ SUBSCRIBER_DATA request which contains not only the mobile subscribers IMSI but also the complete subscriber database contents for that user. In addition, the message will also contain the SS7 address of the HLR 19 so that the authenticity of the message can be verified by the H.323 database 43 upon receipt.

When the H.323 PLMN IWU 39-1 receives the MAP_INSERT_SUBSCRIBER_DATA request, it first checks that the SS7 address is valid, if this passes then the message is translated into the IP format as INSERT_DATA. Using the transaction identity stored when sending the first MAP_UPDATE_ LOCATION message, the PLMN IWU 39-1 is able to determine the destination for the message. When the H.323 database 43 receives the INSERT_DATA message, the data contained in the message is stored in its local database for use in future processing. If all the information is correct, the H.323 database 43 now acknowledges the data using the INSERT_DATA_ACK message. This information is again translated by the PLMN IWU 39-1 into the appropriate MAP message, in this case INSERT_DATA_ACK, and sent to the HLR 19. If the acknowledgement is acceptable to the HLR 19, it then sends a MAP_UPDATE_LOCATION confirm to the PLMN IWU 39-1. The PLMN IWU 39-1, upon receipt of this message, reformats the contents into UPDATE_LOCATION_ACK and sends the message to the H.323 database 43. At this point, the transaction information related to the signaling between the H.323 database 43 and the HLR 19 can be removed as it is no longer required.

Upon receipt of the UPDATE_LOCATION_ACK message, the H.323 database 43 sends a Registration Confirm (RCF) message to the P-BTS on the private network. Receipt of the RCF triggers a series of standard radio interface messages which include Authentication of the Mobile User, Ciphering of the radio link should it be needed. This operation may lead to reallocation of the TMSI if required by the network operator. At the end of this process, the radio resources are released using the standard Channel Release, Disconnect and UA message sequence.

Figure 6:
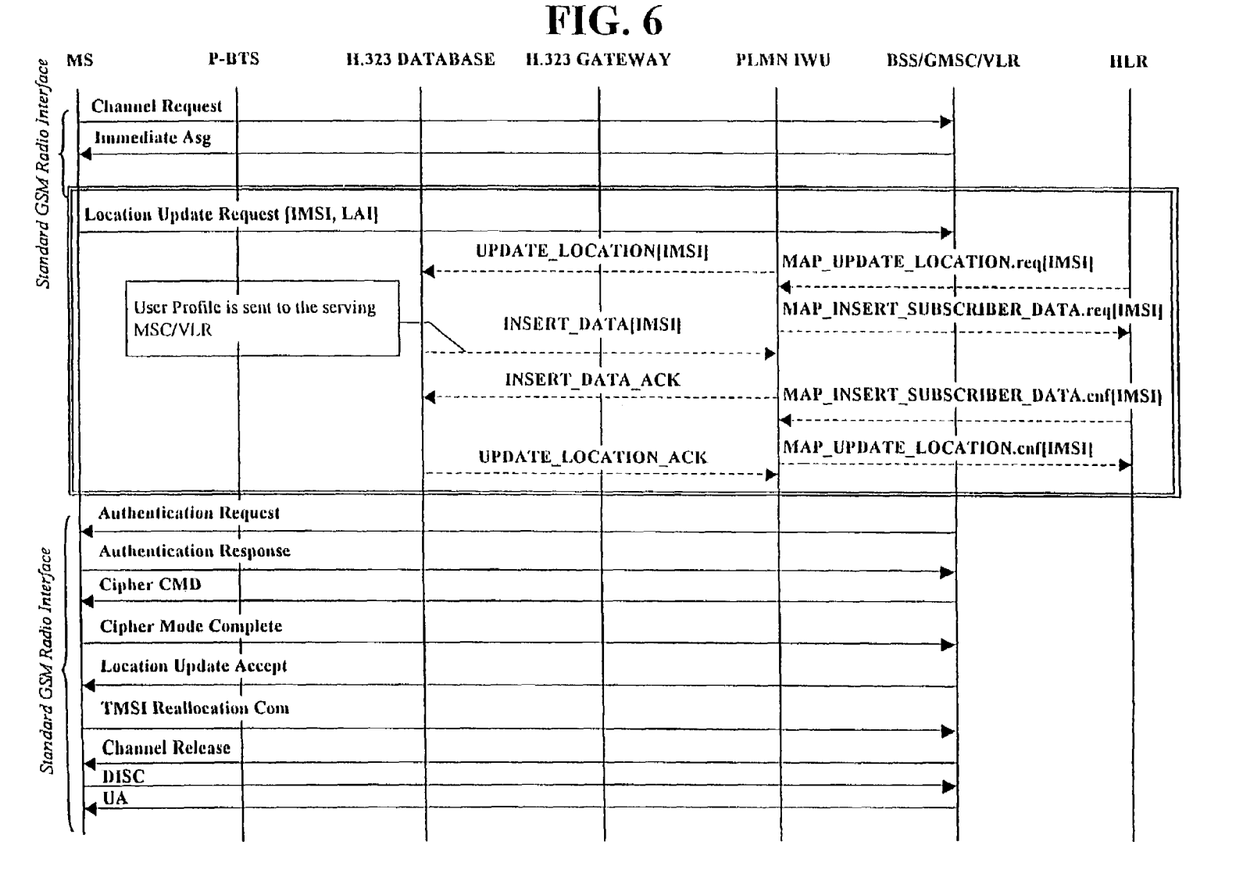
FIG. 6 depicts the location update procedures for a private user in the public network using the PLMN IWU.

Location Update Procedures for a Private User on the Public Network—FIG. 6.

In FIG. 6 the signaling flows that are used to register the Private User on the Public Network are presented.

In the first part of the call flow, the Private Users Mobile Station (MS) accesses the public networks BSS/GMSC/VLR., generally using the standard Channel Request/Immediate Assignment signaling messages, these are not shown here. Upon receipt of the Location Update Request from the MS, containing the IMSI, the public network can determine that this is a private user location update request, consequently all the message links for this user are now directed to the PLMN IWU 39-1 serving this private user. The public network continues the location update process by sending a MAP_UPDATE_LOCATION request to the PLMN IWU 39-1 containing the IMSI of the private user. The PLMN IWU 39-1 then translates this into the correct pseudo-MAP message, in this case a UPDATE_LOCATION which contains the IMSI of the Private Mobile. The PLMN IWU 39-1 also stores the SS7 address and transaction identity of the originating entity in the public network for future reference. The UPDATE_LOCATION message is then forwarded onto the correct H.323 database 43. The PLMN IWU 39-1 determines the correct H.323 database 43 by using its internal database which maps the incoming IMSI onto the IP address of the H.323 database 43.

When the UPDATE_LOCATION message arrives at the H.323 database 43, it is checked for consistency. In addition checks are made to determine if the private subscriber is allowed to roam to the public network. If the private mobile user is not allowed to roam, then the response to the message would be negative (not shown) and the dialogue would be terminated. However, if the user is allowed to roam, then the H.323 database 43 responds with the pseudo-MAP message INSERT_DATA to the PI,MN IWU 39-1 serving the public network. The correct PLMN IWU 39-1 is determined by using the source IP address provided when the UPDATE_LOCATION message was received. The INSERT_DATA message contains all the subscriber database information required by the public network.

When the PLMN IWU 39-1 receives the INSERT_DATA message, it is translated into the correct MAP message, in this case a MAP_INSERT_SUBSCRIBER_DATA request, and sent to the originating SS7 node using the SS7 address supplied in the original MAP_UPDATE_LOCATION request. If the SS7 receiving entity accepts the message from the private network then the MAP_INSERT_SUBSCRIBER_DATA confirmation is returned to the PLMN IWU 39-1. This message is then translated into the pseudo-MAP INSERT_SUBSCRIBER_DATA message and sent to the H.323 database 43 supporting the user. If the response is accepted by the H.323 database 43, then the UPDATE_LOCATION_ACK is sent to the PLMN IWU 39-1. The PLMN IWU 39-1 will then translate this to the required MAP_UPDATE_LOCATION confirm message. At this point, the transaction information related the signaling between the H.323 database 43 and the HLR 19 can be removed as it is no longer required.

Upon receiving the MAP_UPDATE_LOCATION confirm message, the public network may start a series of standard radio interface messages which include Authentication of the Mobile User, Ciphering of the radio link should it be needed. This operation may lead to reallocation of the TMSI if required by the network operator. At the end of this process, the radio resources are released using the standard Channel Release, Disconnect and UA message sequence.

Figure 7:
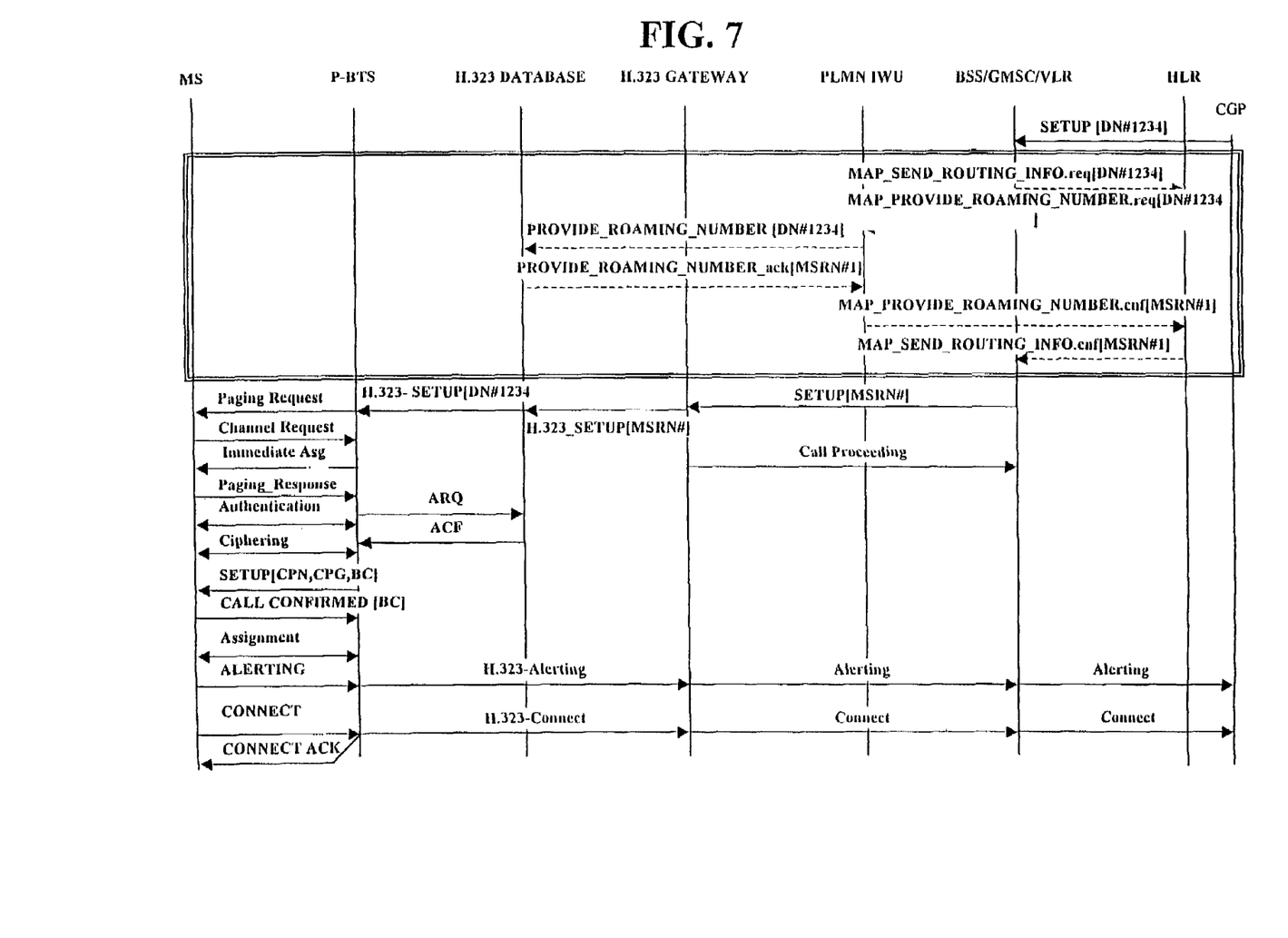
FIG. 7 depicts a Mobile Terminated Call (MTC) to a public user in the private network

Mobile Terminated Call (MTC) to a Public User in the Private Network—FIG. 7.

In FIG. 7 the signaling flows that are used to contact a Public User that is located on the Private Network are presented.

In the first part of the call flow, a SETUP message is received by the Gateway MSC (GMSC) in the public network from the Calling Part (CGP). The SETUP message contains the Dialed Number (DN) of the user, in this case 1234. The GMSC will now try to locate the called user, in order to do this the standard MAP message MAP_SEND_ROUTING_INFO request containing the dialed number is sent to the Public Network HLR 19. The Public HLR 19 then uses the previous location update information (see cases above) to locate the user. In this case, the user is located on the Private Network and the request (MAP_PROVIDE_ROAMING_NUMBER) for a roaming number is sent to the PLMN IWU 39-1 serving the Private Network. The PLMN IWU 39-1 upon receipt of the MAP_PROVIDE_ROAMING_NUMBER message uses the destination address contained in the message to determine the location of the H.323 database 43 serving the public user.

Once the destination has been found, the message is translated into the pseudo-MAP message, PROVIDE_ROAMING_NUMBER request, for dispatch to the serving H.323 database 43. Upon receipt of the PROVIDE_ROAM-ING_NUMBER message, the H.323 database 43 checks whether or not this user is registered in the database. If the user is not registered, then the message is rejected (not shown). If the user is present, then the H.323 database 43 selects a Mobile Station Roaming Number (MSRN) from the allocated pool, it then also associates the selected MSRN with the IMSI of the user in its internal databasse. The H.323 database 43 can now format a pseudo-MAP response message, PROVIDE_ROAMINGNUMBER ack, containing the MSRN that can be sent back to the PLMN IWU 39-1.

When the PLMN IWU 39-1 receives the PROVIDE_ROAMING_NUMBER ack from the H.323 database 43, it formats the message into the MAP_PROVIDE_ROAMING_NUMBER confirmation message to be sent to the public HLR 19. This message will contain the MSRN provided by the H.323 database 43 as well as the correct destination address and transaction identity. When the Public HLR 1 receives this message, it sends the MSRN to the requesting GMSC using the standard MAP_SEND_ROUTING_INFO confirmation message. The GMSC then uses the MSRN to route the call to the H.323 gateway serving the Private Network, this is shown by the SETUP[MSRN#1] message.

When the H.323 Gateway receives the SETUP message with the allocated MSRN, it sends the H.323_SETUP message with the MSRN#1 to the H323 database 43 and sends a Call Proceeding message to the public network. The H.323 database 43 can then determine which Public Mobile user is being called by using the MSRN-IMSI association established in the earlier part of the dialogue. Once the final destination has been determined by the H.323 database 43 using the MSRN-IMSI-IP address mapping, the call can be further routed to the P-BTS using an H.323_SETUP message containing the original dialed digits.

When the P-BTS receives the H.323_SETUP message, it will begin the standard cellular mobile terminated call procedures with an initial Paging Request. The Mobile Station then responds to the Paging Request and the radio link can be established, this may include H.323 Access Request (ARQ) and Access Confirmation (ACT'). Once the correctly ciphered link has been established, the P-BTS can then send the SETUP message to the mobile. The mobile responds with the Call Confirmed message. The network can then assign the radio resources and generate the Alerting message for the public network. If the public user is available, the mobile can be answered, which generates the Connect/Connect Ack message sequence as well as the Connect into the public network.

Figure 8:
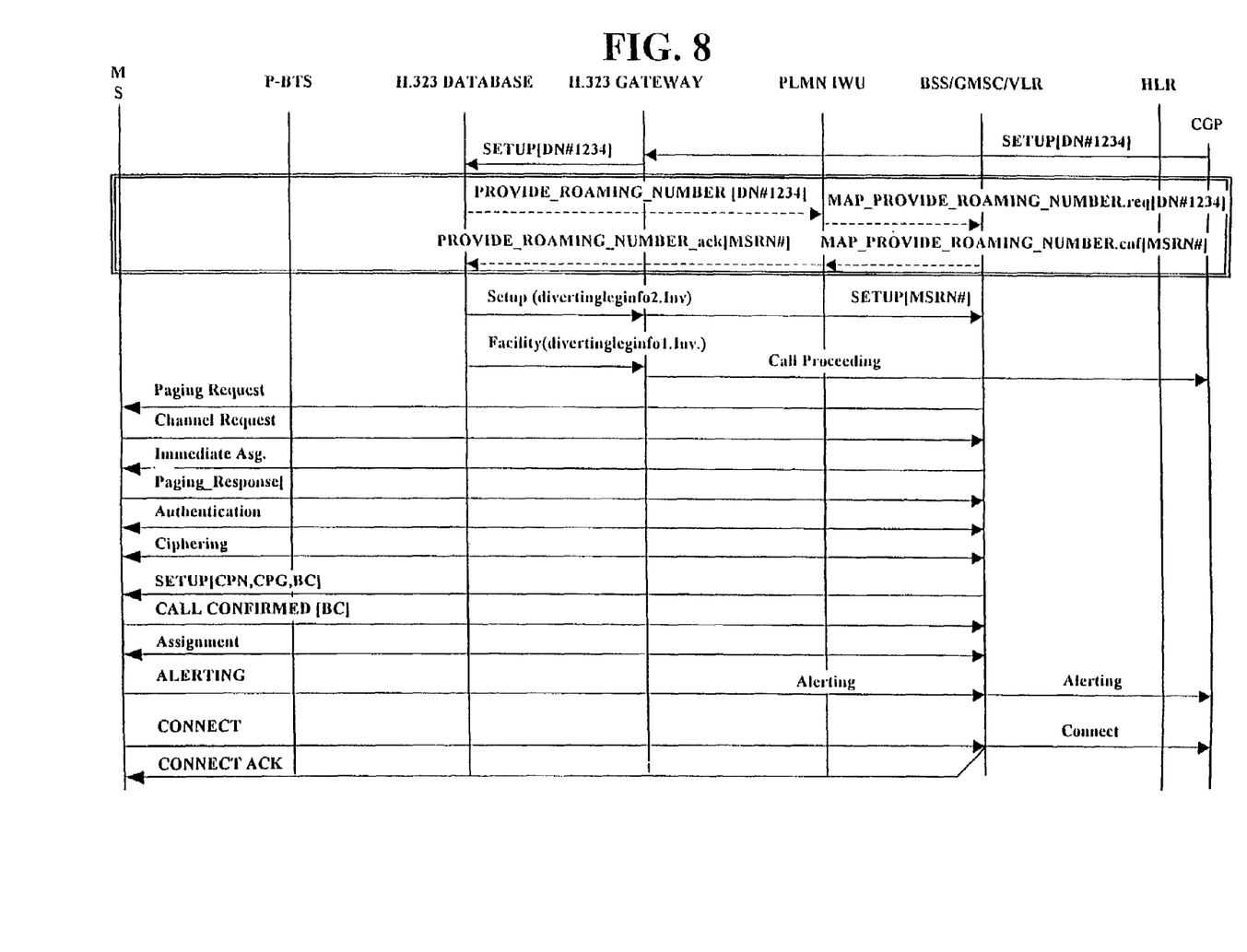
FIG. 8 depicts a Mobile Terminated Call (MTC) to a private user in the public network.

Mobile Terminated Call (MTC) to a Private user in the Public Network FIG. 8.

In FIG. 8 the signaling flows that are used to contact a Private User that is located on the Public Network are presented.

In the first part of the call flow, a SETUP message is received by the H.323 Gateway in the private network from the Calling Part (CGP), this message is forwarded onto the H.323 database 43. The SETUP message contains the Dialed Number (DN) of the user, in this case 1234. As the H.323 database 43 will now try to locate the called user, in order to do this the H.323 database 43 generates the pseudo-MAP PROVIDE_ROAMING_NUMBER message, including adding the SS7 address of MSC/VLR serving the private user, which is forwarded to the PLMN IWU 39-1. The PLMN IWU 39-1 then generates the MAP_PROVIDE_ROAM-ING_NUMBER to request the roaming number from the MSC/VLR serving the Private Mobile user.

When the serving MSC receives the MAP_PROVIDE_ROAMING_NUMBER request, it checks that the user indicated by the IMSI in the message is present in the VLR of the MSC 17. If the user is present, then the MSC/VLR will select a MSRN from its pool of numbers and return the MAP_PROVIDE_ROAM.ING_NUMBER confirmation, containing the MSRN, to the PLMN IWU 39-1 indicated in the received message.

The PLMN IWU 39-1, upon receipt of the MAP_PROVIDE_ROAMING_NUMBER confirm message, uses the origination address and transaction identifier to forward its pseudo-MAP PROVIDE_ROAMING_NUMBER message to the H.323 database 43. The H.323 database 43 uses the MSRN received in the PROVIDE_ROAMING_NUMBER message to redirect the users call to the H.323 gateway. In this case since the call has already arrived at the H.323 gateway it must redirect the call using the H.323_SETUP divert leg option with the MSRN# as the diverted to number. On receipt of the H.323_SETUP message, the H.323 gateway can generate a public network SETUP message towards the Public Network, using the provided MSRN#. In order to clean up the call control in the H.323 gateway the H.323 database 43 then uses the Facility message to indicate that the call currently being set up is a diverted call and this operation then generates a Call Proceeding message to the Calling Part (CGP).

When the public network receives the SETUP message, it will begin the standard cellular mobile terminated call procedures with an initial Paging Request. The Mobile Station then responds to the Paging Request and the radio link can be established. Once the correctly ciphered link has been established, the Public Network can then send the SETUP message to the mobile. The mobile responds with the Call Confirmed message. The network can then assign the radio resources and generate the Alerting message for the public network. If the public user is available, the mobile can be answered, which generates the Connect/Connect Ack message sequence as well as the Connect into the public network.

Figure 9:
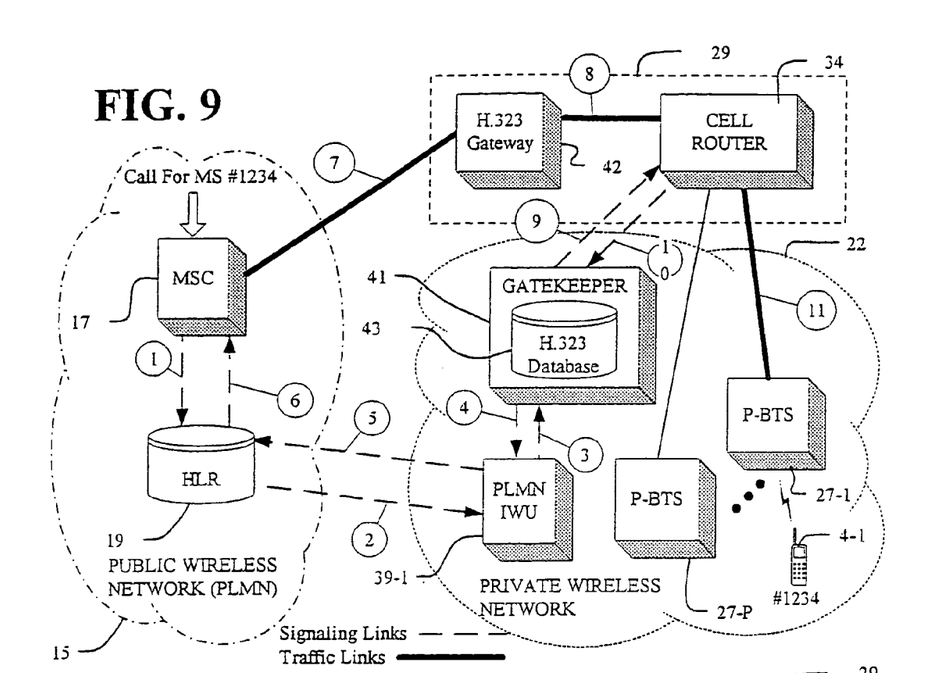
FIG. 9 depicts the call flows of a public user in the private network.

Mobile Terminated Call Operation for Public User in Private Wireless Network—FIG. 9

In FIG. 9, the private network 14 includes a private wireless network 22, having a PLMN IWU 39-1, interconnected to the public wireless network (PLMN) 15. The private wireless network includes a plurality of P-BTSs 27, including P-BTS 27-1, . . . , 27-P, each associated with a corresponding private cell 411 as shown and described in connection with FIG. 4. The public wireless network 15 includes an MSC 17 and a BSS 5 associated with a public cell 11 as shown and described in connection with FIG. 4.

In FIG. 9, the PLMN IWU 39-1 is interconnected to the public HLR 19 of the public wireless network (PLMN) 15 via signaling links (shown as broken lines in FIG. 9). In the embodiment described, these signaling links use the SS7 protocol. The PLMN IWU 39-1 also connects, via a signaling link that uses the IP protocol, to the gatekeeper 41 and the H.323 database 43.

In FIG. 9, the private wireless network 22 includes a gatekeeper 41 that connects to a connection unit 29. The connection unit 29 includes means for interconnecting a mobile station 4, for example, mobile station 4-1 serviced by P-BTS 27-1 in the private wireless network 22, to a call being initiated by the public wireless network 15.

In FIG. 9, for purposes of explanation, it is assumed that mobile station (MS) 4-1 has a calling number #1234. A Call For MS#1234 is present in the MSC 17. The Call For MS#1234 may have originated with a mobile station in the public wireless network 15 or otherwise. The sequence of processing in FIG. 9 for the Call For MS#1234 is represented by circled numbers including circle.1, circle 2, ..., circle_11.

In FIG. 9 at circle_1, the MSC 17 sends a request for routing information to the HLR 19. At circle.2, the HLR 19 sends a request for a roaming number to PLMN IWU 39-1. At circle 3, PLMN IWU 39-1 sends a request for a roaming number to gatekeeper 41 and the H.323 database 43. At circle 4, the H.323 database 43 returns the MSRN (Mobile Station Roaming Number) to the PLMN IWU 39-1. At circle j the PLMN IWU 39-1 forwards the MSRN to the HLR 19. At circle 6, the HLR forwards the MSRN to the MSC 17. At circle 7, the traffic at MSC 17 associated with the Call For MS#1234 is forwarded to the H.323 gateway 42. At circle 8, the traffic from H.323 gateway 42 is forwarded to cell router 34. At pircle_9, the MSRN for the Call For MS#1234 is forwarded to gatekeeper 41 and the H.323 database 43 to obtain an associated IP address. At circle 10, the associated IP address is returned to cell router 34. In the present example, the IP address for the Call For MS#1234 is assumed to be for the P-BTS 27-1. At circle 11, the call traffic for the Call For MS#1234 is routed to P-BTS 27-1 and thence over the air interface to mobile station 4-1 which is the mobile station having MS#1234.

Figure 10:
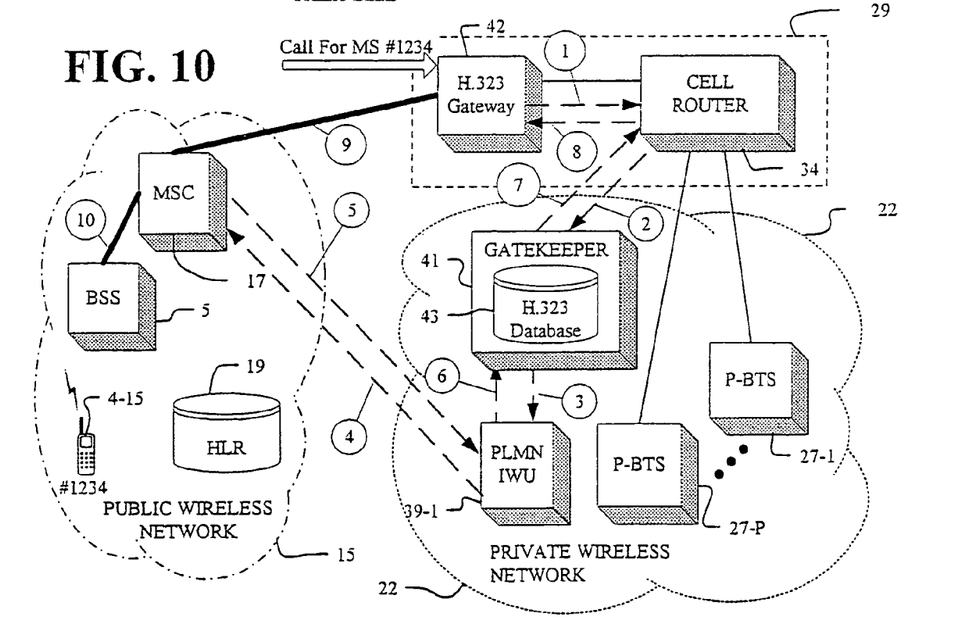
FIG. 10 depicts the call flows of a private user in the public network.

Mobile Terminated Call Operation for Private User in Public Wireless Network —FIG. 10

In FIG. 1.0, the private network 14 includes a private wireless network 22, having a PLMN IWU 39-1, interconnected to the public wireless network (PLMN) 15. The private wireless network includes a plurality of P-BTSs 27, including P-BTS 27-1, ..., 27-P, each associated with a corresponding private cell 411 as shown and described in connection with FIG. 4. The public wireless network 15 includes an MSC 17 and a BSS 5 associated with a public cell 11 as shown and described in connection with FIG. 4.

In FIG. 10, the PLMN IWU 39-1 is interconnected to the MSC 17 of the public wireless network (PLMN) 15 via signaling links (shown as broken lines in FIG. 10). In the embodiment described, these signaling links use the SS7 protocol. The PLMN IWU 39-1 also connects, via a signaling link that uses the 1P protocol, to the gatekeeper 41 and the H.323 database 43.

In FIG. 10, the private wireless network 22 includes a gatekeeper 41 that connects to a connection unit 29. The connection unit 29 includes means for interconnecting a mobile station 4, for example, mobile station 4-15 serviced by BSS 15 in the public wireless network 15, to a call being initiated by the private wireless network. The mobile station 4-15 in FIG. 10 is, for example, the same mobile station 4-1 in FIG. 9 that has moved from being serviced by the private wireless network 22 to being serviced by the public wireless network 15.

In FIG. 10, for purposes of explanation, it is assumed that mobile station (MS) 4-15 has the same calling number #1234 as mobile station 4-1 in FIG. 9 and that mobile stations 4-1 and 4-15 are the same unit. A Call For MS#1234 is present in the gateway 42. The Call For MS#1234 may have originated with a mobile station in the private wireless network 22 or otherwise. The sequence of processing in FIG. 10 for the Call For MS#1234 is represented by circled numbers including circle_1, circle_2, ..., circle_10.

In FIG. 10, at circle_1, the gateway 42 sends a request for routing information to the router 34. At circle_2, the router 34 sends a request for routing information to the gatekeeper 41 and database H.323. At circle_3, the gatekeeper 41 sends a request for a roaming number (Mobile Station Roaming Number) to PLMN IWU 39-1. At circle_4, PLMN IWU 39-1 sends a request for a roaming number to MSC 17. At circle 5, the MSC 17 returns the MSRN to the PLMN IWU 39-1. At circle_6 the PLMN IWU 39-1 forwards the MSRN to the gatekeeper 43 and database 43. At circle_7, the gatekeeper 41 forwards the MSRN to the cell router 34. At circle_8, the cell router forwards the MSRN to the gateway 42. At circle_9, the traffic from H.323 gateway 42 is forwarded to MSC 17. At circle_10, the traffic for the Call For MS#1234 is forwarded to BSS thence over the air interface to mobile station 4-15 which is the mobile station having MS#1234.

While the invention has been particularly shown and described with reference to preferred embodiments thereof it will be understood by those skilled in the art that various changes in form and details may be made therein without departing from the scope of the invention.

What is claimed is:

1. A network interworking apparatus that enables mobile station roaming between wireless networks using different network communication protocols, the apparatus comprising:
    a first interface using a first protocol for sending and receiving control signal messages to and from a first wireless network, said first wireless network is a public wireless network having one or more public cells;
    a second interface using a second protocol for sending and receiving control signal messages to and from a second wireless network, said second wireless network is a private wireless network having one or more private cells within one or more of said public cells and having mobile stations that move among the private and public cells;
    a correlation unit including:
    a first software stack that processes the control signal messages of the first protocol including:
    a signal message encoder/decoder layer responsible for receiving and dispatching said control signal messages to and from said first wireless network, wherein the signal message encoder/decoder layer is located at the application layer and performs message formatting for use by lower layers of the first software stack;
    a second software stack that processes the control signal messages of the second protocol including:
    a signal message encoder/decoder layer responsible for receiving and dispatching said control signal messages to and from said second wireless network, wherein the signal message encoder/decoder layer is located at the application layer and performs message formatting for use by lower layers of the second software stack; and
    a protocol conversion unit that converts control signal messages from the first software stack to the second software stack format or converts control signal messages from the second software stack to the first software stack format based on an algorithmically predetermined mapping of first network messages with an equivalent second network messages and delivers said control messages to and from the first and second software stacks.

2. The apparatus of claim 1 further comprising a database unit that associates each first wireless network element with a network address using said second wireless network address format and associates each second wireless network element with a network address using said first wireless network address format to enable the protocol conversion unit to convert control signal message origin and destination addresses to the address format of the destination wireless network.

3. The apparatus of claim 1 wherein said first wireless network operates with and SS7 protocol.

4. The apparatus of claim 1 wherein said first wireless network is a public wireless network.

5. The apparatus of claim 4 wherein the apparatus is located on a premises of said public wireless network.

6. The apparatus of claim 4 wherein said public network is a Public Land Mobile Network.

7. The apparatus of claim 1 wherein second wireless network is a private wireless network.

8. The apparatus of claim 7 wherein the apparatus is located on a premises of said private wireless network.

9. The apparatus of claim 1 wherein said first stack includes MTP, SCCP and TCAP layers for an SS7 protocol and wherein said second stack includes IP and TCP/UDP layers for an IP protocol.

10. The apparatus of claim 2 wherein said database unit maps SS7 point codes or E.164 numbers to corresponding IP addresses.

11. The apparatus of claim 10 wherein address mapping is performed statically using an operations and maintenance interface.

12. The apparatus of claim 10 wherein address mapping is performed dynamically as new addresses are received.

13. A network interworking apparatus that enables mobile station roaming between wireless networks using different network communication protocols, the apparatus comprising:
a first interface using a first protocol for sending and receiving control signal messages to and from a first wireless network;
a second interface using a second protocol for sending and receiving control signal messages to and from a second wireless network;
a correlation unit including:
a first software stack that processes the control signal messages of the first protocol including:
a signal message encoder/decoder layer responsible for receiving and dispatching said control signal messages to and from said first wireless network, wherein the signal message encoder/decoder layer is located at the application layer and performs message formatting for use by lower layers of the first software stack;
a second software stack that processes the control signal messages of the second protocol including:
a signal message encoder/decoder layer responsible for receiving and dispatching said control signal messages to and from said second wireless network, wherein the signal message encoder/decoder layer is located at the application layer and performs message formatting for use by lower layers of the second software stack;
a protocol conversion unit that converts control signal messages from the first software stack to the second software stack format or converts control signal messages from the second software stack to the first software stack format based on an algorithmically predetermined mapping of first network messages with an equivalent second network messages and delivers said control messages to and from the first and second software stacks; and
a Mobile Application Part layer adjacent to one of said message encode/decode layers for said first software stack.

14. A method of network interworking that enables a mobile station to roam between wireless networks using different network communication protocols, the method comprising:
using a first interface and protocol to send and receive control signal messages to and from a first wireless network, said first wireless network is a public wireless network having one or more public cells;
using a second interface and protocol to send and receive control signal messages to and from a second wireless network, said second wireless network is a private wireless network having one or more private cells within one or more of said public cells and having mobile stations that move among the private and public cells;
correlating control signal messages between first and second wireless networks using:
a first software stack that processes the control signal messages of the first protocol using:
a signal message encoder/decoder layer responsible for receiving and dispatching said control signal messages to and from said first wireless network, wherein the signal message encoder/decoder layer is located at the application layer and performs message formatting for use by lower layers of the first software stack;
a second software stack that processes the control signal messages of the second protocol using:
a signal message encoder/decoder layer responsible for receiving and dispatching said control signal messages to and from said second wireless network, wherein the signal message encoder/decoder layer is located at the application layer and performs message formatting for use by lower layers of the second software stack; and
a protocol conversion unit that converts control signal messages from the first software stack to the second software stack format or converts control signal messages from the second software stack to the first software stack format based on an algorithmically predetermined mapping of first network messages with equivalent second network messages and delivers said control messages to and from the first and second software stacks.

15. The method of claim 14 further comprising associating each first wireless network element with a network address using said second wireless network address format and associating each second wireless network element with a network address using said first wireless network address format to enable conversion of control signal message origin and destination addresses to the address format of the destination wireless network.

16. The method of claim 14 wherein said first wireless network operation with an SS7 protocol.

17. The method of claim 14 wherein said first wireless network is a public wireless network.

18. The method of claim 17 wherein the interworking device is located on a premises of said public wireless network.

19. The method of claim 17 wherein said public wireless network is a Public Land Mobile Network.

20. The method of claim 14 wherein said second wireless network is a private wireless network.

21. The method of claim 20 wherein interworking device is located on a premises of said private wireless network.

22. The method of claim 14 wherein said first stack includes MTP, SCCP and TCAP layers for an SS7 protocol and wherein said second stack includes IP and TCP/UDP layers for IP protocol.

23. The method of claim 14 wherein association is performed using a database unit that maps SS7 point codes or E.164 numbers to corresponding IP addresses.

24. The method of claim 23 wherein address mapping is performed statically using an operations and maintenance interface.

25. The method of claim 23 wherein address mapping is performed dynamically as new addresses are received.

26. A method of network interworking that enables a mobile station to roam between wireless networks using different network communication protocols, the method comprising:
  using a first interface and protocol to send and receive control signal messages to and from a first wireless network;
  using a second interface and protocol to send and receive control signal messages to and from a second wireless network;
  correlating control signal messages between first and second wireless networks using:
  a first software stack that processes the control signal messages of the first protocol using:
  a signal message encoder/decoder layer responsible for receiving and dispatching said control signal messages to and from said first wireless network, wherein the signal message encoder/decoder layer is located at the application layer and performs message formatting for use by lower layers of the first software stack;
  a second software stack that processes the control signal messages of the second protocol using:
  a signal message encoder/decoder layer responsible for receiving and dispatching said control signal messages to and from said second wireless network, wherein the signal message encoder/decoder layer is located at the application layer and performs message formatting for use by lower layers of the second software stack;
  a protocol conversion unit that converts control signal messages from the first software stack to the second software stack format or converts control signal messages from the second software stack to the first software stack format based on an algorithmically predetermined mapping of first network messages with equivalent second network messages and delivers said control messages to and from the first and second software stacks; and
  a Mobile Application Part layer adjacent to one of said message encode/decode layers for said first software stack.

* * * * *